United States Patent [19]

Soloway

[11] Patent Number: 4,765,377
[45] Date of Patent: Aug. 23, 1988

[54] FILLING AND WEIGHING SYSTEM

[76] Inventor: Sidney Soloway, 202 Sunrise Hill Rd., Norwalk, Conn. 06851

[21] Appl. No.: 501,653

[22] Filed: Jun. 6, 1983

[51] Int. Cl.⁴ .............................................. H06S 5/02
[52] U.S. Cl. ........................................ 141/1; 141/83; 141/98; 141/392; 73/DIG. 4; 137/807; 177/210 FP; 406/6
[58] Field of Search ................ 406/1, 4, 6, 46; 141/1, 141/11, 69, 70, 83, 85, 94, 98, 392; 137/13, 807; 73/DIG. 1, DIG. 4; 177/210 FP; 361/233

[56] References Cited

U.S. PATENT DOCUMENTS

| | | | |
|---|---|---|---|
| 2,637,408 | 10/1950 | Yadoff | 55/3 |
| 3,071,154 | 1/1963 | Cargill et al. | 137/807 |
| 3,260,320 | 7/1966 | Clamp | 177/1 |
| 3,327,223 | 5/1967 | Halista | 137/807 |
| 3,332,506 | 7/1967 | Bradfield | 177/210 FP |
| 3,413,993 | 12/1968 | Ziemer | 137/807 |
| 3,492,858 | 2/1970 | Heflinger et al. | 73/580 |
| 3,524,459 | 8/1970 | Brunberg et al. | 137/807 |
| 3,693,083 | 9/1972 | Hamilton et al. | 324/98 |
| 3,766,472 | 10/1973 | Whitney | 177/210 FP X |
| 3,788,410 | 1/1974 | Allenspach et al. | 177/25 |
| 3,797,890 | 3/1974 | Walters | 141/83 X |
| 3,872,361 | 3/1975 | Masuda | 361/233 |
| 4,050,530 | 9/1977 | Storace | 177/1 |
| 4,051,395 | 9/1977 | Taylor | 310/329 |
| 4,096,740 | 6/1978 | Sallée | 73/597 X |
| 4,227,182 | 10/1980 | Ogasawara et al. | 73/DIG. 4 X |
| 4,254,800 | 3/1981 | Masaki | 137/13 X |
| 4,286,459 | 9/1981 | Trimmer et al. | 73/DIG. 4 X |
| 4,294,105 | 10/1981 | Kelly | 73/28 |
| 4,301,685 | 11/1981 | Guillemot | 73/DIG. 4 X |
| 4,317,372 | 3/1982 | Harteman | 73/DIG. 4 |
| 4,372,173 | 2/1983 | Eernisse et al. | 73/DIG. 4 X |

FOREIGN PATENT DOCUMENTS 3678872 11/1966 Japan ........................ 177/210 FP Primary Examiner—Henry J. Recla
Assistant Examiner—Ernest G. Cusick
Attorney, Agent, or Firm—Costas & Montgomery

[57] ABSTRACT

A filling and weighing system and method for particulate matter in which the particulate matter in powder form is electrically charged and electrically directed to a container on a weight-frequency sensitive balance. The frequency shift of the balance is a measure of the weight of the powder in the container and when a predetermined frequency shift occurs, this is a measure of a predetermined weight of the powder in the container.

29 Claims, 2 Drawing Sheets

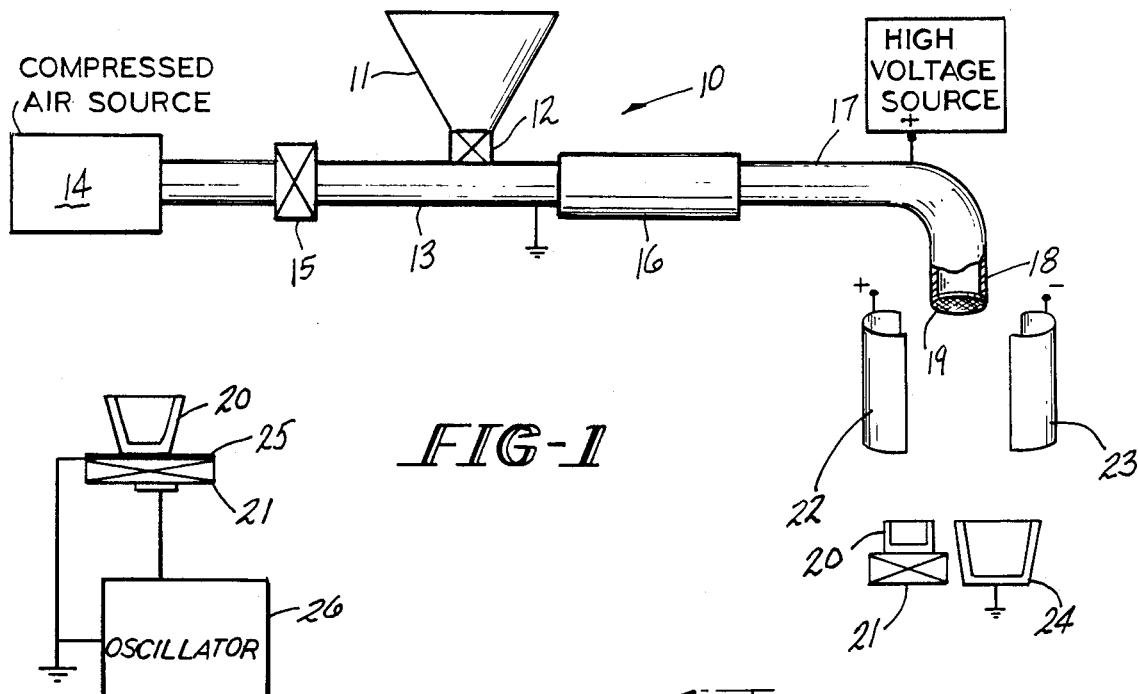
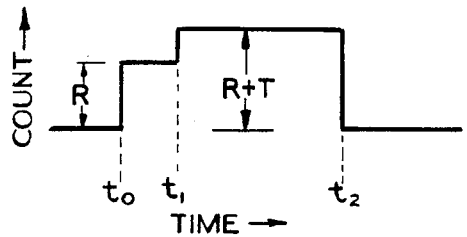
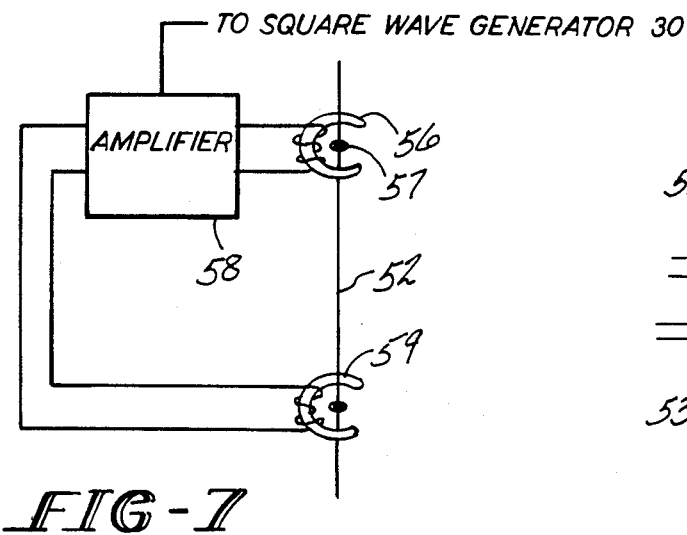
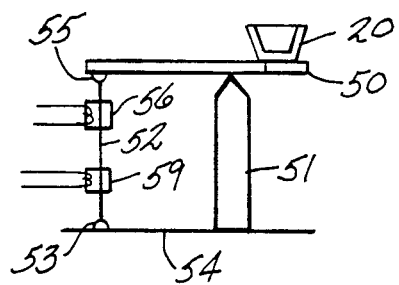

FILLING AND WEIGHING SYSTEM

FIELD OF THE INVENTION

This invention relates to weighing systems, and more particularly, relates to the dispensing and rapid weighing of particulate matter.

BACKGROUND OF THE INVENTION

In many instances, material in particulate form is dispensed and packaged, as for example, the packaging of pharmaceutical powders, such as penicillin.

A need exists for the rapid dispensing of such materials with high weighing accuracy, for example, within one percent. The close tolerance in the weighing is important in controlling the doses that will subsequently be dispensed to patients.

One method that is now being used for penicillin is to assume that volume is nearly equivalent to a known weight, and on this basis, dispense reproducible volumes of powder. However, this volumetric method does not provide repeatability within one percent. A second method is to use strain gages as a method of measuring force and therefore, weight. Strain gauges are very temperature sensitive and their analog output makes them very sensitive to electronic drift. While the limitations in the above methods can be minimized with engineering effort, a satisfactory solution to the overall problem is not now apparent.

Accordingly, the present invention provides a new and improved method of dispensing and weighing matter in particulate form.

SUMMARY OF THE INVENTION

Briefly stated, the invention, in one form thereof, comprises moving the particulate material or powder through a housing using compressed gas such as air as the moving force and electrically charging the powder as it moves through the housing, then electrically deflecting or directing the charged powder to a container. As the container reaches a predetermined weight, the charged powder may be deflected to a reservoir until the next container is positioned to receive the charged powder or alternatively, the gas may be cut off. The container is placed at an electrical ground so that electrically charged particles are electrically attracted to it. The container may be moved to a filling position by any suitable conveyor or transfer mechanism. In the filling position, the container is placed on a balance, which is preferably a crystal oscillating at its resonance frequency. The frequency of the crystal will then change with weight. When a frequency shift corresponding to a known desired weight has occurred, the powder dispensing system is turned off and/or the powder is directed to an adjacent reservoir until the next container is placed at the filling point. Then dispensing of the powder is recommenced directed to the new container.

An object of this invention is to provide a new and improved dispensing and weighing system for material in particulate or powder form.

Another object of this invention is to provide a new and improved dispensing system for material in particulate or powder form.

The features of the invention which are believed to be novel are particularly pointed out and distinctly claimed in the concluding portion of this specification. However, the invention may best be appreciated by reference to the following detailed description taken in conjunction with the drawings.

BRIEF DESCRIPTION OF THE DRAWINGS

FIG. 1 is a diagrammatic view in side elevation of apparatus which may be employed in the invention, together with a view of a receptacle on a crystal balance;

FIG. 2 is a view of the crystal weighing system of FIG. 1; and

FIGS. 5a and 5b are timing diagrams exemplifying the operation of the circuit of FIG. 4;

FIG. 6 is a schematic representation of an alternate weighing mechanism; and

FIG. 7 is an enlarged view, partially in perspective of a portion of FIG. 6.

DETAILED DESCRIPTION OF THE ILLUSTRATED EMBODIMENT

Figure 3:
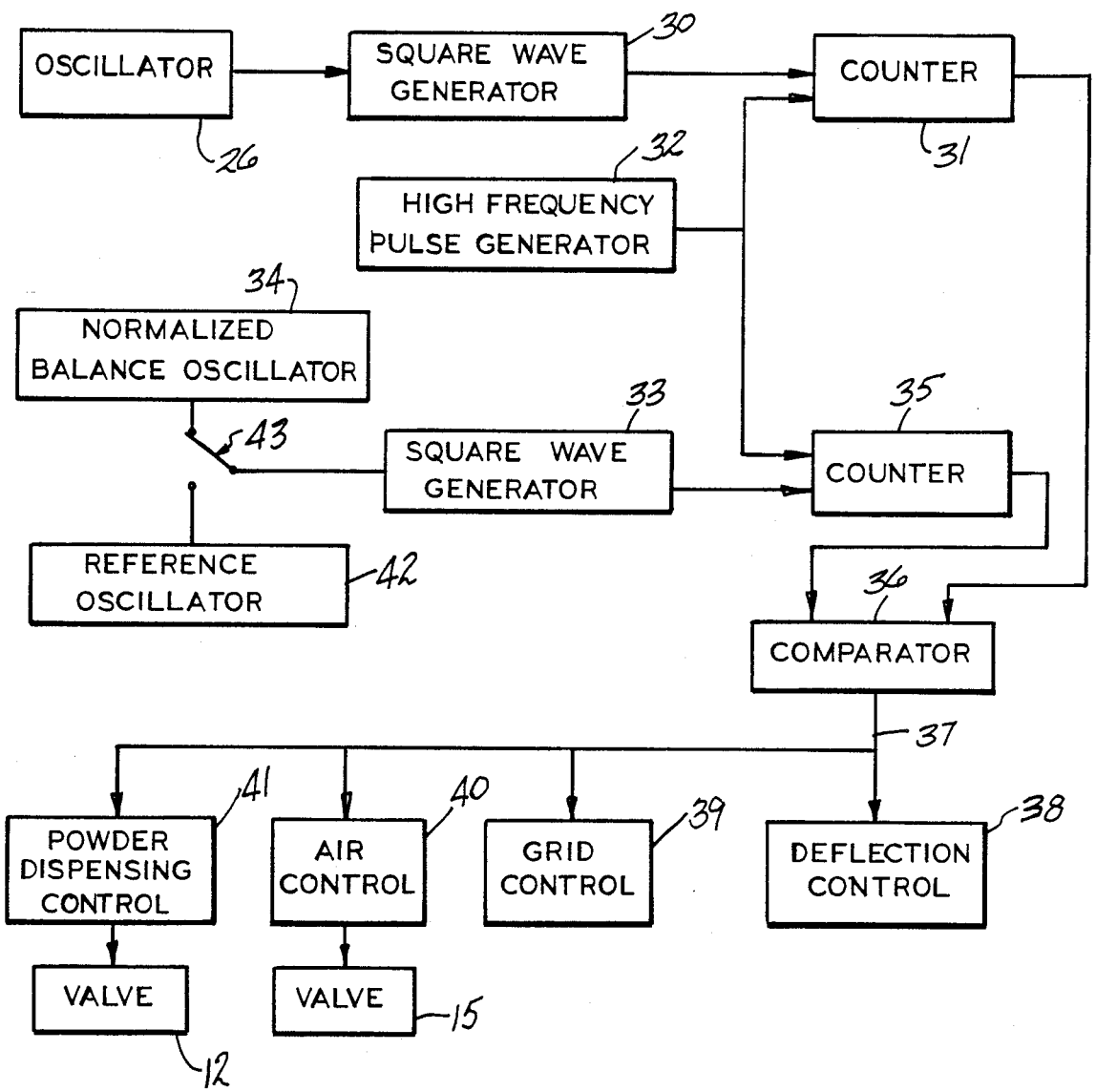
FIG. 3 is a block diagram of one type of weighing system which may be utilized in conjunction with the invention.

Apparatus 10 embodying a portion of the invention comprises a housing member or hopper 11 for particulate matter positioned above an electrically controllable valve 12 which may permit the particulate matter to fall into an electrically grounded conduit 13. A compressed gas source 14 will create pressure in conduit 13 if another electrically operated valve 15 is open. Conduit 13 is connected through an electrically insulating conduit 16 to a high voltage charging and dispensing pipe 17 having a nozzle portion 18. An electrically conductive grid 19 is disposed across the opening of nozzle portion 18. The insulating conduit 16 prevents arcing from the charged section. Alternatively, conduit 16 may be a very high resistance.

Disposed below nozzle 19 is a receptacle 20 on a crystal 21. Receptacle 20 is positioned to receive electrically charged powder or particulate matter from nozzle portion 18, dependent on the direction of the particulate matter as determined by deflection electrodes 22 and 23. Electrodes 22 and 23 may almost instantaneously direct charged particulate matter either to receptacle 20 or to a collection reservoir 24.

In operation of the system of FIG. 1, when valves 12 and 15 are open, particulate matter will enter conduit 13 from hopper 11 and be blown through the high voltage, charging and dispensing tube 17 and grid 19. In passing through tube 17 and grid 19, the particulate matter becomes electrically charged (positive as shown) and directionally subject to the charge on deflection electrodes 22 and 23. The potential on deflection electrodes may be controlled to direct the charged particulate matter either into receptacle 20 or a reservoir 24. Conduit 18 and grid 19 may be charged to a potential of thirty to one-hundred thousand volts and above. The potential may be negative for certain powders if the powders are more receptive to a negative high potential.

Reference is now made to FIG. 2, which exemplifies the receptacle 20 on crystal 21. Receptacle 20 is electrically grounded, either through an included metal base plate or on a grounded metallic coating or a plate 25 on crystal 21.

In a preferred form, receptacle 20 is an inert plastic material having a metal base 25 which is electrically grounded to a crystal 21. As hereinafter described, crystal 21 exemplifies one form of a balance. As the powder is moved through grid 19, the individual particles reach a high potential and form a charged cloud. The particles tend to repel one another but are directed toward the grounded receptacle 20 by the deflection electrodes 22 and 23.

The crystal 21 is incorporated in an oscillator circuit 26. The oscillator will operate at a frequency characteristic of the physical dimensions of the quartz crystal. When a force F is applied to the quartz crystal corresponding to a weight thereon, the resonant frequency will shift by an amount:

$$\Delta F = -2.3 \times 10^6 \times F^2 \frac{(\Delta M_s)}{A}$$

where delta F is a frequency change in MegaHertz (MHz), F is the basic resonant frequency of the crystal in MHz, delta $M_s$ is the mass of the deposited material (grams), and A is the area on which the mass is applied (centimeters squared).

In one application, a 50 KiloHertz (KHz) crystal would show a 5 $KH_z$ frequency shift for ten grams applied to 10 square centimeters of surface area.

The dispensed powder can be weighed with high accuracy at great speed while being dispensed. After a predetermined weight has been collected, the charged particles are electrically redirected at very high speed to the electrically grounded reservoir 24. The filled receptacle 20 may then be removed and another receptacle placed on the crystal balance 21. This may be done by conveyor or any suitable type of transfer mechanism. When a new receptacle 20 is placed at the filling station on the crystal balance, the beam of charged particles is deflected from the reservoir to the new receptacle. The new receptacle is then filled until it has reached a predetermined weight and the filling process is repeated.

Reference is now made to FIG. 3, which exemplifies one form of logic of the weighing system. The output of the crystal controlled oscillator 26 is applied to a square wave generator 30 which generates a square wave having a pulse period equal or proportional to the period of the sine wave output of oscillator 26. The output of the square wave generator 30 is applied to a counting circuit that may be a counter enabled by the square wave from generator 30 to count the pulses of a high frequency pulse generator 32 during the period of the square wave of generator 30. A second square wave generator 33 receives as its input a sine wave from a normalized balance oscillator 34 which is set to provide a frequency equal to the frequency of crystal 21 when it is not stressed. This will provide a reference period square wave output from generator 33 which is applied as an enabling input to a counter 35. Counter 31 will develop a numerical count as a function of the frequency of oscillator 26, which frequency is a function of the weight on crystal 21. The numerical contents of counters 31 and 35 are applied to a comparator 36. In the mode of operation thus far described, comparator 36 will provide an output signal over line 37 to a deflection control circuit 38 when there is a predetermined difference in the number of pulses counted by counters 31 and 35. Such predetermined difference is indicative of a known weight of a filled container. When comparator 36 indicates that a predetermined weight has been reached as represented by a known frequency shift of oscillator 26, a signal is applied over line 37 to a deflection control circuit 38. The potentials of deflection electrodes 23 and 24 are controlled by deflection control circuit 38 to direct the beam of charged particles to reservoir 24.

Additionally, the output of the comparator may be applied to a grid control circuit 39, an air supply control 40, which controls valve 15, and/or a powder dispensing control 41 which controls valve 12 to cease dispensing material to conduit 13.

Also, the output of comparator 37 may be used to disconnect the high voltage source from nozzle 18 and grid 19. If this type of control is utilized, and the valve 15 is closed to interrupt filling, valve 12 will also be closed to avoid buildup of powder in conduit 13.

The square wave generator 33 may alternately receive as an input a sine wave from a reference oscillator 42 which is the same as oscillator 26 used for the balance. Oscillator 42 will be set to have a period indicative of the weight of a filled container. In this case, comparator 36 provides an output signal when the counts in counters 31 and 35 are equal during a period of the wave forms from each of the square wave generators 30 and 33. Such signal is indicative of the desired weight of powder having been dispensed to the container. The reference oscillator may comprise a crystal having thereon a weight of the correct amount to provide a frequency indicative of a container with the desired weight of powder therein. This alternative is exemplified by switch 43.

Figure 4:
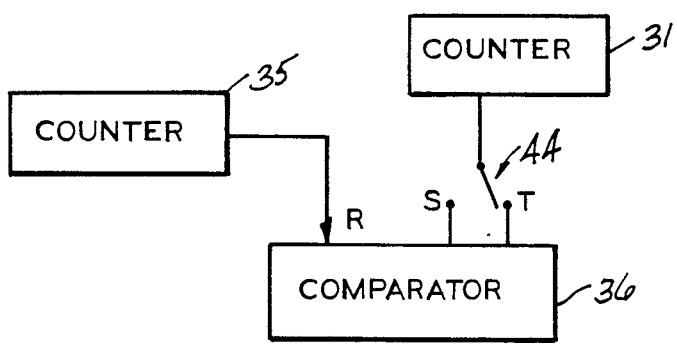
FIG. 4 is a block diagram showing an additional control element for balancing container tare in the arrangement of FIG. 3.

FIG. 4 exemplifies a modified form of the weighing system. When a sample receptacle 20 first arrives at the crystal balance, a comparator switch 44 is set in a tare T position. The output of counter 31 here represents the tare weight of the empty receptacle. This is stored in comparator 36. The output of counter 35 represents the reference weight, and will normally be fixed for a filling run of a given powder.

Referring to FIGS. 5a and 5b, at the time the empty sample receptacle 20 arrives at the crystal balance, the comparator 36 measures and stores the reference input R from counter 35 and tare T from counter 31, and combines to set a count value of R plus T. Switch 44 is now set to the sample position S. Dispensing of powder is initiated at time $t_1$, and continues with the sample increasing in weight until it equals the stored comparator value R plus T, at which time, the beam of powder is deflected to the reservoir 24, or otherwise interrupted. The receptacle has now been filled with the precise quantity of powder desired, a new receptacle is provided and the cycle is repeated.

An alternative balance is shown in FIG. 6, in which weight is determined by detecting the resonant frequency of a stressed wire. A receptacle rests on one side of a platform 50 on a fulcrum member 51. Platform 50 will be at electrical ground, or a ground otherwise defined on container 20. The container 20 is balanced by the stress in a wire 52 secured by an adapter 53 to base 54 and an adaptor 55 on platform 50. This arrangement may be referred to as an acoustic strain gage.

The tensile stress of the wire varies with the weight of receptacle 20, and the length of the wire varies with tensile stress. The resonant frequency of the wire varies with length. Equations for this relationship are given in *Instrumentation In Scientific Research* by K. S. Lion, McGraw Hill, 1959, 1983.

The natural frequency f of a string or wire of Length L and cross-sectional area as held between two fixed suspensions is:

$$f = \frac{1}{2L} \sqrt{\frac{F}{aS}} = \frac{1}{2L} \sqrt{\frac{\sigma}{S}}$$

where F is the applied force holding the wire taut and causing a tensile stress $\sigma = F/a$ in the wire, and S is the density of the wire material.

A change in length of the wire can be used as a measure of applied force:

$$f = \frac{1}{2L} \sqrt{Y/S \cdot \Delta L/L}$$

where $\Delta L/L$ is $\sigma/Y$ and Y is Young's modulus.

The mechanical oscillation of the stressed wire 52 is converted to an electric signal by an inductive pick-up 56. As the wire oscillates, it varies the flux in the air gap 57 of pick-up 56 (FIG. 7). This output signal is amplified in amplifier 58 and fed back to an electromagnet 59 in an appropriate phase to keep the wire vibrating at its natural frequency. The sine wave output of amplifier 58 is applied to square wave generator 30, FIG. 3, and determination of weight may be made as explained in conjunction with FIG. 3 or 4.

Systems of the type described are capable of making measurements within 0.01 second (excluding filling time) with an accuracy of better than one percent.

It may thus be seen that the objects of the invention set forth as well as those made apparent from the foregoing description are efficiently attained. While preferred embodiments of the invention have been set forth for purposes of disclosure, modification of the disclosed embodiments of the invention as well as other embodiments thereof may occur to those skilled in the art. Accordingly, the claims are intended to cover all embodiments of the invention and modifications to the disclosed embodiments which do not depart from the spirit and scope of the invention.

What is claimed is:

1. A method of filling a container with a predetermined weight of material in powder form comprising the steps of
   providing a conduit,
   creating a gas stream through said conduit,
   introducing the material into a gas stream in said conduit and moving said material through an electric field in said conduit to produce an electric charge on the powder particles,
   providing a container for said powder particles at a filling and weighing station,
   electrically directing the stream of charged particles from said conduit into the container,
   maintaining an electrical potential at said one of said container and said filling and weighing station which attracts said charged particles to said container,
   sensing when the weight of the particles in the container reaches a predetermined value, and ceasing direction of the stream to the container.

2. The method of claim 1 wherein the step of ceasing direction of the stream to the container includes the step of electrically directing the stream to a separate reservoir.

3. The method of claim 1 wherein the step of ceasing direction includes the step of ceasing introduction of the material into the gas stream.

4. The method of claim 1 wherein the step of ceasing direction includes the step of halting the gas stream.

5. The method of claim 1 wherein the step of ceasing direction includes the step of halting the gas stream and ceasing introduction of powder.

6. The method of claim 1 where said step of electrically directing includes providing means defining an electric field and passing said powder through the electric field to direct the powder to the container.

7. The method of claim 1 where said step of electrically directing comprises providing means defining an electric field externally of said conduit before said container and controlling said electric field to control the direction of the powder exiting said conduit.

8. The method of claim 1 wherein the step of ceasing direction includes the step of halting the gas stream.

9. The method of claim 1 wherein the step of ceasing direction includes the step of halting the gas stream and ceasing introduction of powder.

10. A method of filling a container with a predetermined weight of material in a powder form comprising the steps of
    providing a conduit,
    creating a gas stream in said conduit,
    introducing the material into the gas stream and moving said material through an electric field in said conduit to produce an electric charge on the powder particles,
    providing a container for said powder particles at a filling and weighing station,
    discharging said material in a stream from said conduit toward said container,
    electrically directing the discharged stream of charged particles into the container,
    maintaining an electrical potential at one of said filling and weighing station and said container which attracts said stream of charged particles to said container, and
    sensing when the weight of the particles in the container reaches a predetermined value, and ceasing direction of the stream to the container.

11. The method of claim 10 wherein the step of ceasing direction of the stream to the container includes the step of electrically directing the stream to a separate reservoir.

12. The method of claim 10 wherein the step of ceasing direction includes the step of ceasing introduction of the material into the gas stream.

13. A method of filling a container with a predetermined weight of material in powder form comprising the steps of
    providing a conduit,
    creating a gas stream in said conduit,
    introducing the material into the gas stream and moving said material through an electric field to produce an electric charge on the powder particles,
    providing a container for said powder particles at a filling and weighing station,
    establishing an electric field external of said conduit to direct said stream of particles to said container,
    maintaining one of said container and said weighing station at an electrical potential which attracts said particles, sensing when the weight of the particles in the container reaches a predetermined value, and ceasing direction of the stream to the container.

14. Apparatus for filling a container with a predetermined weight of material in powder form comprising
means defining a conduit, means for moving said powder through said conduit,
means for electrically charging said powder in said conduit,
a weighing device effective to emit a signal having a frequency which is a function of stress applied thereto,
means for electrically directing a stream of said charged powder to a container on said weighing device,
said weighing device being at an electrical potential which attracts said charged powder to said container,
and means responsive to the signal frequency of said weighing device reaching a predetermined value for ceasing application of powder to said container.

15. The apparatus of claim 14 where said weighing device is a crystal in an oscillator circuit and the container is placed on said crystal.

16. The apparatus of claim 15 where the container is at electrical ground on said crystal.

17. The apparatus of claim 16 where said crystal includes a ground plate, and the container rests on said ground plate.

18. The apparatus of claim 14 wherein said weighing device is an acoustic strain gage which resonates at a frequency proportional to applied stress, and means responsive to said strain gage providing a signal having a frequency proportional to applied stress.

19. The apparatus of claims 14 or 18 further including means providing a signal having a reference frequency, said means responsive to the signal frequency of said weighing device being responsive to a predetermined numerical relationship between said reference frequency and said weighing frequency.

20. The apparatus of claim 14 further including means providing a reference frequency, means providing a frequency indicative of the tare of a container, comparator means for storing a numerical representation of the tare of the container and the desired weight of the powder in the container, means for applying a numerical signal to said comparator which increases in value as the powder is dispensed, said comparator providing a control signal when said numerical signal is equal to said numerical representation.

21. Apparatus for filling a container with a predetermined weight of material in powder form comprising means defining a conduit, means for moving said powder through said conduit, means for electrically charging said powder in said conduit, means for electrically directing a stream of said charged powder from said conduit to a container at a weighing station, means maintaining one of said container and weighing station at an electrical potential which attracts said stream of charged powder to said container, and means responsive to the weight of said container reaching a predetermined value for ceasing direction of powder to said container.

22. The apparatus of claim 21 wherein said means responsive to the weight of said container reaching a predetermined value includes means for directing the beam of the charged powder to a reservoir.

23. The apparatus of claim 21 wherein said means responsive to the weight of said container reaching a predetermined value includes means for halting the gas stream and ceasing introduction of powder to said conduit.

24. The apparatus of claim 21 where said weighing device is a crystal in an oscillator circuit and the container is placed on said crystal.

25. The apparatus of claim 24 where the container is at electrical ground on said crystal.

26. The apparatus of claim 25 where said crystal includes a ground plate, and the container rests on said ground plate.

27. The apparatus of claim 24 wherein said weighing device is an acoustic strain gage which resonates at a frequency proportional to applied stress, and means responsive to said strain gage providing a signal having a frequency proportional to applied stress.

28. The apparatus of claim 24 further including means providing a signal having a reference frequency, said means responsive to the signal frequency of said weighing device being responsive to a predetermined numerical relationship between said reference frequency and said weighing frequency.

29. The apparatus of claim 24 further including means providing a reference frequency, means providing a frequency indicative of the tare of a container, comparator means for storing a numerical representation of the tare of the container and the desired weight of the powder in the container, means for applying a numerical signal to said comparator which increases in value as the powder is dispensed, said comparator providing a control signal when said numerical signal is equal to said numerical representation.

* * * * *